(12) United States Patent
Gatson et al.

(10) Patent No.: US 11,068,073 B2
(45) Date of Patent: Jul. 20, 2021

(54) USER-CUSTOMIZED KEYBOARD INPUT ERROR CORRECTION

(71) Applicant: Dell Products, L.P., Round Rock, TX (US)

(72) Inventors: Michael S. Gatson, Austin, TX (US); Vivek Viswanathan Iyer, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 0 days.

(21) Appl. No.: 16/714,437

(22) Filed: Dec. 13, 2019

(65) Prior Publication Data

US 2021/0181863 A1    Jun. 17, 2021

(51) Int. Cl.
  *G06F 3/02* (2006.01)
  *G06F 3/023* (2006.01)

(52) U.S. Cl.
  CPC .......... *G06F 3/0227* (2013.01); *G06F 3/0231* (2013.01)

(58) Field of Classification Search
  CPC ......... G06F 3/02; G06F 3/0227; G06F 3/0231
  See application file for complete search history.

(56) References Cited

U.S. PATENT DOCUMENTS

| | | | | |
|---|---|---|---|---|
| 6,950,988 | B1* | 9/2005 | Hawkins | G06F 3/0237 715/700 |
| 10,223,057 | B2* | 3/2019 | Aurongzeb | G06F 1/1686 |
| 10,254,803 | B1* | 4/2019 | Quinn | G06F 1/1616 |
| 10,296,053 | B1* | 5/2019 | Quinn | G06F 3/03547 |
| 10,592,051 | B1* | 3/2020 | Yildiz | G06F 3/0481 |
| 2006/0143509 | A1* | 6/2006 | Okawa | G06F 11/1052 714/11 |
| 2006/0274051 | A1* | 12/2006 | Longe | G06F 40/232 345/173 |
| 2008/0203817 | A1* | 8/2008 | Luo | G06F 1/1669 307/64 |
| 2010/0262814 | A1* | 10/2010 | Pardoe | G06F 9/4812 712/244 |
| 2010/0315266 | A1* | 12/2010 | Gunawardana | G06F 3/04886 341/22 |
| 2011/0085211 | A1* | 4/2011 | King | G06F 16/951 358/474 |
| 2013/0046544 | A1* | 2/2013 | Kay | G06F 3/04886 704/275 |
| 2015/0116362 | A1* | 4/2015 | Aurongzeb | G06F 1/1677 345/650 |
| 2016/0313816 | A1* | 10/2016 | Krishnakumar | G06F 3/017 |
| 2017/0168522 | A1* | 6/2017 | Kapinos | G06F 1/1618 |
| 2018/0096203 | A1* | 4/2018 | King | G06F 40/166 |
| 2018/0129391 | A1* | 5/2018 | Files | G06F 40/171 |
| 2018/0336197 | A1* | 11/2018 | Skilling | G10L 15/187 |
| 2018/0349346 | A1* | 12/2018 | Hatori | G06F 40/53 |
| 2019/0129558 | A1* | 5/2019 | Yildiz | G06F 3/0412 |

* cited by examiner

*Primary Examiner* — Joe H Cheng
(74) *Attorney, Agent, or Firm* — Fogarty LLP

(57) ABSTRACT

Systems and methods for providing user-customized keyboard input error correction based on contextual information are described. In some embodiments, an Information Handling System (IHS) may include a processor and a memory coupled to the processor, the memory having program instructions stored thereon that, upon execution by the processor, cause the IHS to: monitor context information; receive an input via a keyboard; and identify an error in the input, at least in part, based upon the context information.

19 Claims, 6 Drawing Sheets

USER-CUSTOMIZED KEYBOARD INPUT ERROR CORRECTION

FIELD

This disclosure relates generally to Information Handling Systems (IHSs), and more specifically, to systems and methods for providing user-customized keyboard input error correction based on contextual information.

BACKGROUND

As the value and use of information continues to increase, individuals and businesses seek additional ways to process and store information. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Generally, an IHS may include one or more input devices through which a user can interact with it. A keyboard, for example, is an apparatus that uses an arrangement of buttons or keys configured to act as mechanical levers and/or electronic switches. In various implementations, a keyboard may have symbols, such as numerals and/or characters, engraved or printed on its keys. Each keystroke causes a corresponding symbol to be received by the IHS.

SUMMARY

Embodiments of systems and methods for providing user-customized keyboard input error correction based on contextual information are described. In an illustrative, non-limiting embodiment, an Information Handling System (IHS) may include a processor and a memory coupled to the processor, the memory having program instructions stored thereon that, upon execution by the processor, cause the IHS to: monitor context information; receive an input via a keyboard; and identify an error in the input, at least in part, based upon the context information.

In some cases, the context information may include an IHS posture selected from the group consisting of: laptop, tablet, book, tent, and display. Additionally, or alternatively, the context information may include a hinge angle. Additionally, or alternatively, the context information may indicate whether the IHS is coupled to a dock. Additionally, or alternatively, the context information may include a distance between the user and at least one of: the IHS, the keyboard, or a display coupled to the IHS.

Additionally, or alternatively, the context information may include a type of keyboard, and the type may be selected from the group consisting of: a physical keyboard integrated into the IHS, a physical keyboard external to the IHS, or an on-screen keyboard. Additionally, or alternatively, the context information may include an identification of a user operating the keyboard. Additionally, or alternatively, the context information may include whether a user operating the keyboard is typing with one or two hands. Additionally, or alternatively, the context information may include an identification of a software application configured to receive the input.

Additionally, or alternatively, the context information may include a time of day. Additionally, or alternatively, the context information may include a physical or geographic location of the IHS.

Additionally, or alternatively, the context information may include a keystroke sequence preceding a backspace, deletion, insertion, or pause. Additionally, or alternatively, the context information may include a keystroke correction following a backspace, deletion, insertion, or pause. Additionally, or alternatively, the context information may include a keystroke speed. Additionally, or alternatively, the context information may include a keystroke acceleration or deceleration.

In some cases, the program instructions, upon execution, may cause the IHS to correct the error, at least in part, based upon the context information. To correct the error, the program instructions, upon execution, may cause the IHS to: in response to the context information indicating a first state, perform a first operation upon the input; and in response to the context information indicating a second state, perform a second operation upon the input, where the second state is different from the first state and wherein the second operation is different from the first operation. The first and second operations may be selected from the group consisting of: transposing, adding, removing, or replacing a character from the input.

In another illustrative, non-limiting embodiment, a memory device having program instructions stored thereon that, upon execution by a processor of an IHS, cause the IHS to: monitor context information; receive an input via a keyboard; determine whether to transpose, add, remove, or replace a character from the input, at least in part, using the context information; and modify the input based upon the determination.

In yet another illustrative, non-limiting embodiment, a method may include: monitoring, by an IHS, context information; receiving an input via a keyboard; in response to the context information indicating a first state, performing a first operation upon the input; and in response to the context information indicating a second state, performing a second operation upon the input, where the second state is different from the first state, where the second operation is different from the first operation, and where the first and second operations are selected from the group consisting of: transposing, adding, removing, or replacing a character from the input.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity and have not necessarily been drawn to scale.

DETAILED DESCRIPTION

Systems and methods described herein provide user-customized keyboard input error correction based on contextual information. Particularly, these systems and methods enable an Information Handling System (IHS) to detect and to effect corrections for continual improvement in keyboard entry, tied to learning behavior. Statistics, feedback, and/or corrections may be specific to each individual user, application, keyboard, and/or IHS characteristics.

In some cases, systems and methods described herein may provide adaptive and use-learned correction of keyboard input (e.g., compared to spell check), as well as auto-correction of keystrokes that is personalized to users and learned across devices, user, and system context. Additionally, or alternatively, certain systems and method may implement: the use of tracking hysteresis behind misspelling of proper nouns and personalized corrections, real-time inference execution tied to multiple parameters (keystroke plus contextual input), and/or input parameter identification into machine learning (ML) and/or artificial intelligence (AI) algorithms.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components.

Figure 1:
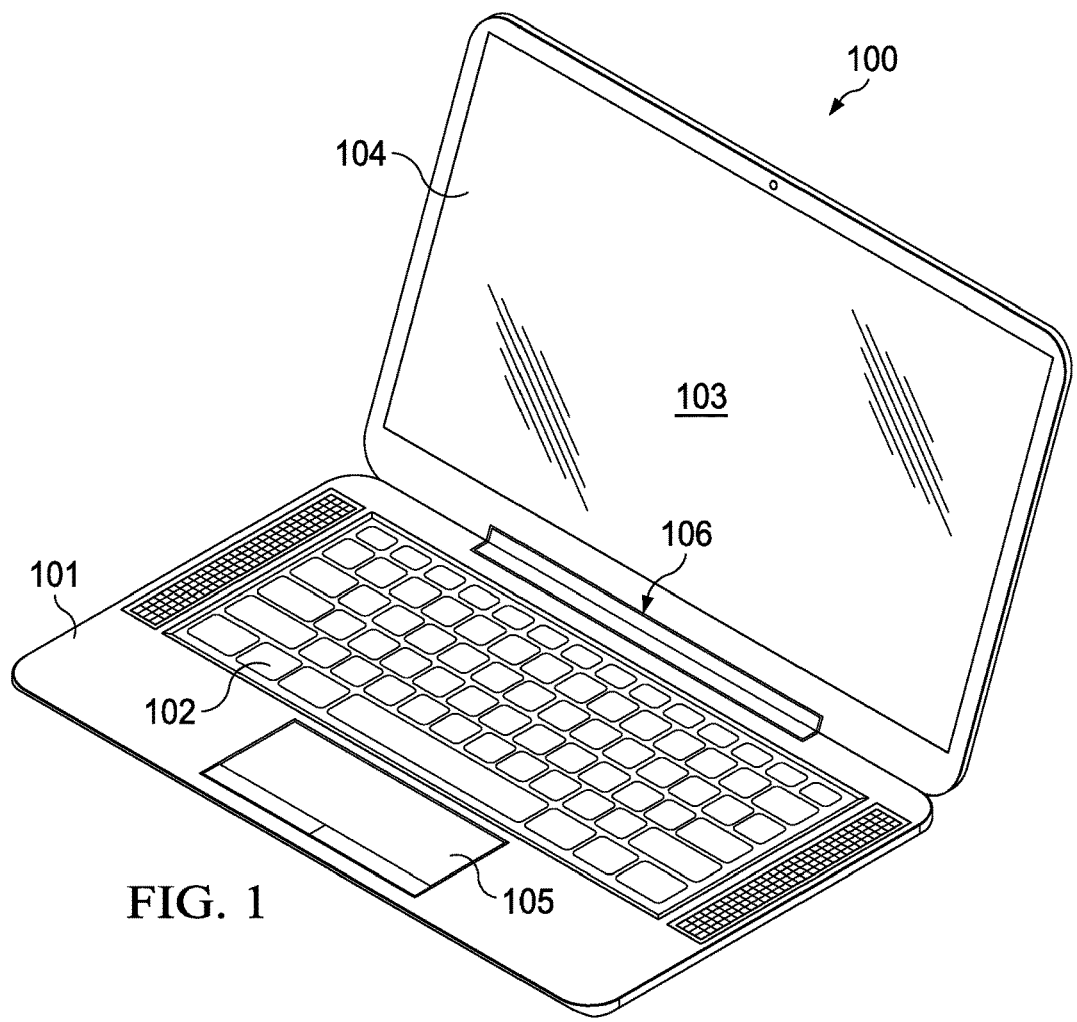
FIG. 1 is a perspective view of an example of an Information Handling System (IHS) according to some embodiments.

FIG. 1 is a perspective view of an example of IHS 100. As shown, IHS 100 includes base or bottom portion 101 fastened to lid or top portion 104. In many implementations, top portion 104 may be pivotably coupled to base portion 101 via hinge 106, such that top portion 104 may be moved between a closed position and an open position with respect to base portion 101. In many implementations, different types of hinges 106 may be used to achieve and maintain different display postures, and to support different keyboard arrangements.

In some implementations, top portion 104 may include display 103 (e.g., a touch screen display or the like) configured to present visual content, such as a graphical user interface, still images, video, etc. using any appropriate technology such as a liquid crystal display (LCD), organic light-emitting diode (OLED), etc. Meanwhile, base portion 101 may accommodate user input devices such as keyboard 102 and touchpad 105. In other implementations, however, base portion 101 may include an additional or secondary display similar to display 103, and the additional display may present another graphical user interface to the user including, for example, in the form of a virtual or on-screen keyboard (OSK), and/or a virtual trackpad.

Keyboard 102 may include a plurality of keys. Each key of keyboard 102 may have a symbol or character imprinted thereon for identifying the key input associated with that particular key. In operation, keyboard 102 may be arranged to receive a discrete input at each key using a downward finger motion usually referred to as a "keystroke" or "keypress." Keystrokes may be converted to electrical signals by an embedded controller (or a dedicated keyboard controller) which are then passed to chipset 202 and/or processor(s) 201, shown in FIG. 2, for evaluation and/or control.

Figure 2:
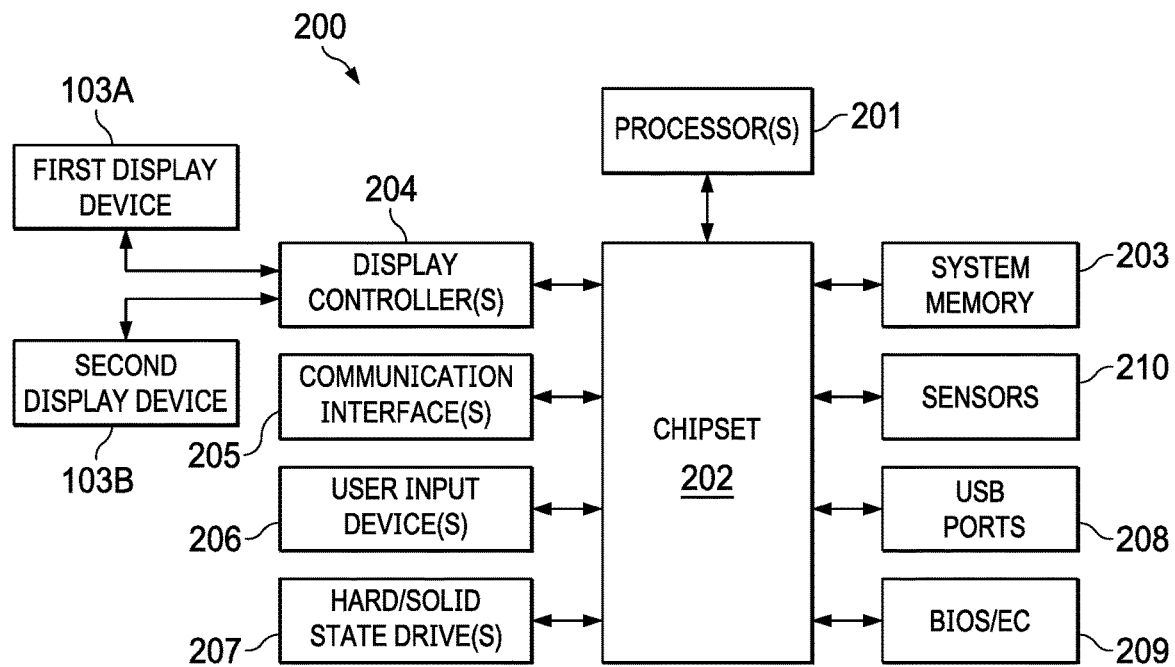
FIG. 2 is a block diagram of examples of components of an IHS according to some embodiments.

FIG. 2 is a block diagram of components 200 of IHS 100. As depicted, components 200 include processor 201. In various embodiments, IHS 100 may be a single-processor system, or a multi-processor system including two or more processors. Processor(s) 201 may include any processor capable of executing program instructions, such as a PENTIUM series processor, or any general-purpose or embedded processors implementing any of a variety of Instruction Set Architectures (ISAs), such as an x86 ISA or a Reduced Instruction Set Computer (RISC) ISA (e.g., POWERPC, ARM, SPARC, MIPS, etc.).

IHS 100 includes chipset 202 coupled to processor(s) 201. In certain embodiments, chipset 202 may utilize a QuickPath Interconnect (QPI) bus to communicate with processor(s) 201. In various embodiments, chipset 202 may provide processor(s) 201 with access to a number of resources. Moreover, chipset 202 may be coupled to communication interface(s) 205 to enable communications with other IHSs and/or peripheral devices via various wired and/or wireless networks, such as Ethernet, WiFi, BLUETOOTH, cellular or mobile networks (e.g., CDMA, TDMA, LTE, etc.), satellite networks, or the like. For example, communication interface(s) 205 may be coupled to chipset 202 via a PCIe bus.

Chipset 202 may be coupled to display controller(s) 204, which may include one or more or graphics processor(s) (GPUs) on a graphics bus, such as an Accelerated Graphics Port (AGP) or Peripheral Component Interconnect Express (PCIe) bus. As shown, display controller(s) 204 provide video or display signals to first display device 103A and second display device 103B. For example, first display device 103A may be installed in top portion 104 and second display device 103B may be installed in base portion 101 of IHS 100. In other implementations, however, any number of display controller(s) 204 and/or display devices 103A-N may be used.

Each of display devices 103A and 103B may include a flexible display that is deformable (e.g., bent, folded, rolled, or stretched) by an external force applied thereto. For example, display devices 103A and 103B may include LCD, OLED, or AMOLED, plasma, electrophoretic, or electrowetting panel(s) or film(s). Each display device 103A and 103B may include a plurality of pixels arranged in a matrix, configured to display visual information, such as text, two-dimensional images, video, three-dimensional images, etc.

Display device(s) 103A/103B may be configured to sense haptic and/or physical touch events, and to generate touch information. To this end, display device(s) 103A/103B may include a touchscreen matrix (e.g., a layered capacitive panel or the like) and/or touch controller configured to receive and interpret multi-touch gestures from a user touching the screen with a stylus (e.g., stylus 501 in FIG. 5C) or one or more fingers. Generally, display and/or touch control aspects of display device(s) 103A/103B may be collectively operated and controlled by display controller(s) 204.

In some cases, display device(s) 103A/103B may also comprise a deformation or bending sensor configured to generate deformation or bending information including, but not limited to: the bending position of a display (e.g., in the form of a "bending line" connecting two or more positions at which bending is detected on the display), bending direction, bending angle, bending speed, etc. In these implementations, display device(s) 103A/103B may be provided as a single continuous display, rather than two discrete displays.

Chipset 202 may also provide processor 201 and/or display controller(s) 204 with access to memory 203. In various embodiments, system memory 203 may be implemented using any suitable memory technology, such as static RAM (SRAM), dynamic RAM (DRAM) or magnetic disks, or any nonvolatile/Flash-type memory, such as a solid-state drive (SSD) or the like. Memory 203 may store program instructions that, upon execution by processor 201 and/or controller(s) 204, present a UI interface to a user of IHS 100.

Chipset 202 may further provide access to one or more hard disk and/or solid-state drives 207. In certain embodiments, chipset 202 may also provide access to one or more optical drives or other removable-media drives. In certain embodiments, chipset 202 may also provide access to one or more Universal Serial Bus (USB) ports 208.

Upon booting of IHS 100, processor(s) 201 may utilize Basic Input/Output System (BIOS) 209 instructions to initialize and test hardware components coupled to IHS 100 and to load an Operating System (OS) for use by IHS 100. BIOS 209 provides an abstraction layer that allows the OS to interface with certain hardware components that are utilized by IHS 100. Via the hardware abstraction layer provided by BIOS 209, software stored in memory 203 and executed by the processor(s) 201 of IHS 100 is able to interface with certain I/O devices that are coupled to the IHS 100. The Unified Extensible Firmware Interface (UEFI) was designed as a successor to BIOS. As a result, many modern IHSs utilize UEFI in addition to or instead of a BIOS. As used herein, BIOS is intended to also encompass UEFI.

Chipset 202 may also provide access to one or more user input devices 206, for example, using a super I/O controller or the like. For instance, chipset 202 may provide access to a keyboard (e.g., keyboard 102), mouse, trackpad, stylus, totem, or any other peripheral input device, including touchscreen displays 103A and 103B. These input devices may interface with chipset 202 through wired connections (e.g., in the case of touch inputs received via display controller(s) 204) or wireless connections (e.g., via communication interfaces(s) 205). In some cases, chipset 202 may be used to interface with user input devices such as keypads, biometric scanning devices, and voice or optical recognition devices.

In certain embodiments, chipset 202 and/or EC 309 may provide an interface for communications with one or more sensors 210. Sensors 210 may be disposed within portions 102/104, and/or displays 103A/103B, and/or hinge 106, and may include, but are not limited to: electric, magnetic, hall effect, radio, optical, infrared, thermal, force, pressure, touch, acoustic, ultrasonic, proximity, position, angle, deformation, bending, direction, movement, velocity, rotation, acceleration and/or lid sensor(s). In some cases, one or more sensors 210 may be a part of keyboard 103 when implemented as a removable keyboard (wired or wireless).

Processor(s) 201 may be configured to process information received from sensors 210 and to perform a customized keyboard input error correction operation for a given user, for example, based upon the user's username or identification, as well other context information.

For instance, during operation, the user may open, close, flip, swivel, or rotate either of displays 103A and/or 103B, via hinge 106 to produce different postures. In some cases, processor(s) 201 may be configured to determine a current posture of IHS 100 using sensors 210. For example, when second display 103A (in top portion 104) is folded against display 103B (in base portion 101) so that the two displays have their backs against each other, IHS 100 may be said to have assumed a canvas posture, a tablet posture, a book posture, a stand posture, or a tent posture, depending upon whether IHS 100 is stationary, moving, horizontal, resting at a different angle, and/or its orientation (landscape vs. portrait). For each posture and/or hinge angle, processor(s) 201 may perform a different keyboard input error correction operation.

Moreover, a different keyboard input error correction operation may also be performed based on other context information such as the presence or distance of the user with respect to IHS 100, keyboard 102, and/or display 103. In these cases, processor(s) 201 may process user presence data received by sensors 210 and may determine, for example, whether an IHS's end-user is present or absent.

In situations where the end-user is present before IHS 100, processor(s) 201 may further determine a distance of the end-user from IHS 100 continuously or at pre-determined time intervals. The detected or calculated distances may be used by processor(s) 201 to classify the user as being in the IHS's near-field (user's position<threshold distance A), mid-field (threshold distance A<user's position<threshold distance B, where B>A), or far-field (user's position>threshold distance C, where C>B) with respect to IHS 100, keyboard 102, and/or display 103.

More generally, in various implementations, processor(s) 201 may receive IHS context information using sensors 210 including one or more of, for example: user's presence state (e.g., present, near-field, mid-field, far-field, absent), IHS location (e.g., based on the location of a wireless access point or Global Positioning System), IHS movement (e.g., from an accelerometer or gyroscopic sensor), lid state (e.g., of a laptop), hinge angle (e.g., between base portion 101 and top portion 104), IHS posture (e.g., laptop, tablet, book, tent, and display), whether the IHS is coupled to a dock or docking station, a distance between the user and at least one of: the IHS, the keyboard, or a display coupled to the IHS, a type of keyboard 103 (e.g., a physical keyboard integrated into IHS 100, a physical keyboard external to IHS 100, or an on-screen keyboard), whether the user is operating the keyboard is typing with one or two hands (e.g., holding a stylus, or the like), a time of day, software application(s) under execution in focus for receiving keyboard input, etc.

Examples of yet other context information usable by processor(s) 201 to perform different keyboard input error correction operations include, but are not limited to: (i) a keystroke sequence preceding a backspace, deletion, insertion, or pause; (ii) a keystroke correction following a backspace, deletion, insertion, or pause; (iii) a keystroke speed; (iv) a keystroke acceleration or deceleration, etc.

In various embodiments, IHS 100 may not include all of components 200 shown in FIG. 2. Additionally, or alternatively, IHS 100 may include components in addition to those shown in FIG. 2. Additionally, or alternatively, components represented as discrete in FIG. 2 may be integrated with other components. For example, all or a portion of the functionality provided by the illustrated components may be implemented in a System-On-Chip (SOC), or the like.

Figure 3:
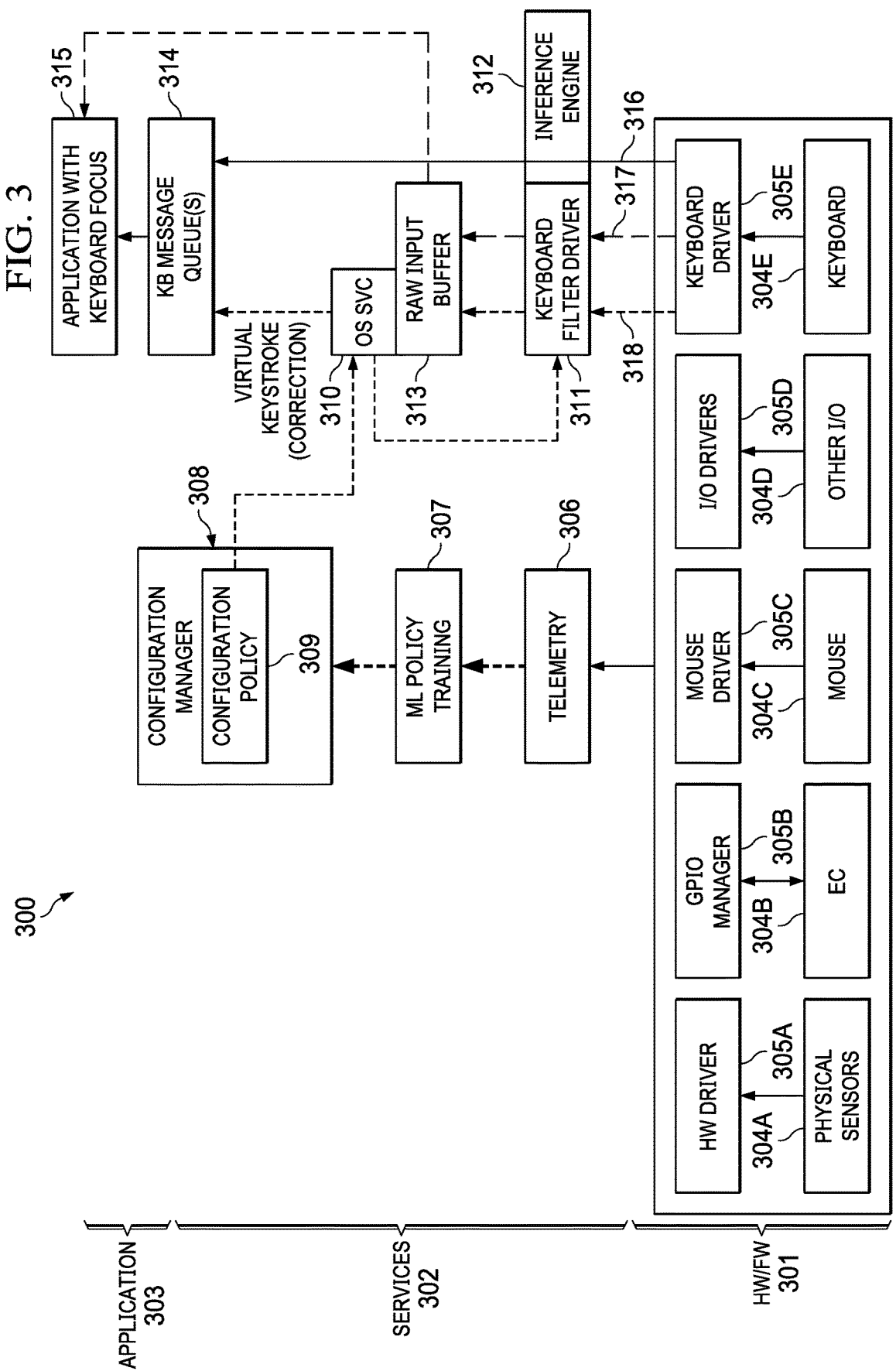
FIG. 3 is a block diagram of an example of a system configured to provide user-customized keyboard input error correction based on contextual information, according to some embodiments.

FIG. 3 is a block diagram of system 300 configured to provide user-customized keyboard input error correction based on contextual information. In various embodiments, hardware/firmware modules 301, services modules 302, and application modules 303 may be instantiated upon the execution of program instructions (e.g., by processor(s) 201 and/or EC 209 of FIG. 2) stored in a memory (e.g., system memory 203) and/or firmware (e.g., coupled to a keyboard controller within keyboard 102 of FIG. 1).

Hardware/firmware modules 301 include: physical sensors 304A (e.g., sensors 210 in FIG. 2) coupled to corresponding hardware driver(s) 305A, EC 304B (e.g., EC 209) coupled to general-purpose input/output (GPIO) manager 305B, mouse or trackpad 304C (e.g., trackpad 105 in FIG. 1) coupled to mouse or trackpad driver 305C, other I/O devices and sensors 304D coupled to corresponding I/O drivers 305D, and keyboard 304E (e.g., keyboard 102) coupled to keyboard driver 305E.

Hardware/firmware modules 301 are coupled to services modules 302. Services modules 302 include telemetry agent 306 coupled to ML policy training module 307 and configuration manager 308 (including one or more configuration policies 309) coupled to ML policy training module 307. OS service 310 is coupled to configuration manager 308, keyboard filter driver 311, and keyboard message queue 314.

Inputs received by keyboard driver 305E are passed to application 315 of application modules 303 via paths 316, 317, and/or 318. Particularly, path 316 provides keyboard input directly to keyboard message queue 314, which then passes the input to application 315. Path 317 provides keyboard input to keyboard filter driver 311, which then provides its output to raw input buffer 313 managed by OS service 310, and then directly to application 315, thus bypassing keyboard message queue 314. Additionally, or alternatively, path 318 provides keyboard input to keyboard filter driver 311, which then provides its output to raw input buffer 313 managed by OS service 310, and the output of OS service 310 (e.g., a virtual keystroke correction) is passed to keyboard message queue 314, and then to application 315.

In operation, OS service 310, keyboard filter driver 311, and/or hardware telemetry module 306 may collect user input to learn misspelled common words and common entry errors for an individual user, via ML policy training module 307, and to auto-correct when user is in flow (user specific) on a device (device specific) with specific state context (e.g., postures, hinge angle, location, etc.) and/or application context (e.g., type of application, such as word processor, messaging software, etc.).

In some embodiments, OS service 310 and/or keyboard filter driver 311 may make corrections specific to an application in focus (e.g., application 315) during a user's flow state at runtime. A further embodiment provides corrections and learnings specific to use of specific keyboards and across devices, postures, and/or state.

System 300 may be configured to track user keyboard raw data input history with hysteresis in OS service 310, determine matches, and make corrections to keyboard message queue 314 based on polic(ies) 309 set within inference engine 312 using keyboard filter driver 311; which sits between keyboard controller 304A and OS message queue or raw input 313. In some cases, corrections may take the form of transposing, adding, removing, or replacing a character from the keyboard input depending upon context.

Moreover, system 300 may be configured to gather telemetry via module 306 against a parameter list for characterizing user keyboard input behavior, and policies 308 may be machine learned using module 307 over time during a training phase. An example of a parameter list includes, but is not limited to: tracking hysteresis (character count limit), text input history or tracking history (keystroke sequence preceding backspace(s), DEL-key deletion(s), targeted deletion(s), targeted insertion(s), and/or pause over a threshold duration), user corrections history (keystroke sequence following backspace(s), DEL-key deletion(s), targeted deletion(s), targeted insertion(s), pause over a threshold duration), switching from/to keyboard to/from other I/O, application/window with keyboard focus, blur event, text entry speed, text entry acceleration/deceleration, character hysteresis during text entry acceleration/deceleration, time of day, type of keyboard (full desktop, mobile, specific), etc.

Figure 4:
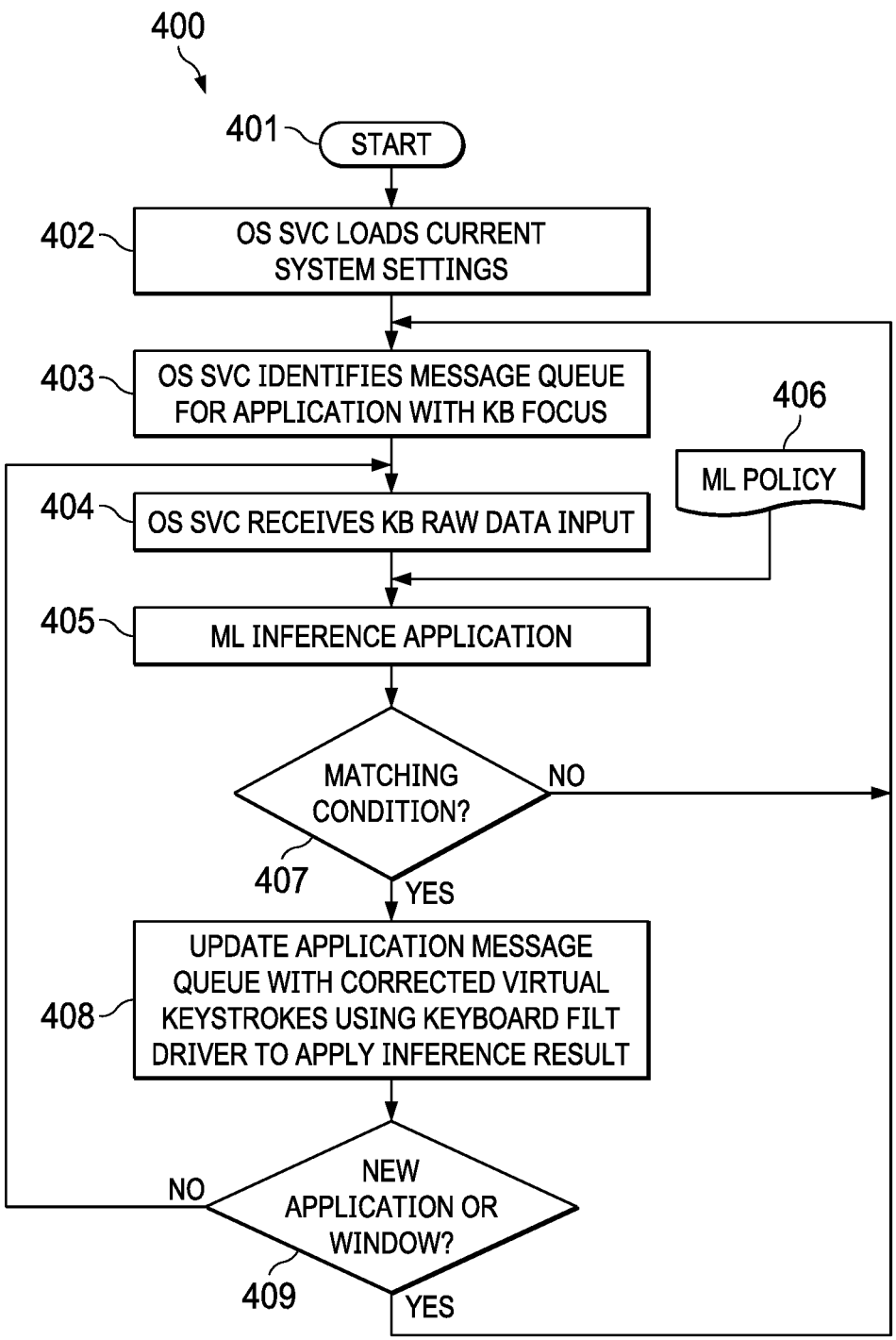
FIG. 4 is a flowchart of an example of a method for providing user-customized keyboard input error correction based on contextual information, according to some embodiments.

FIG. 4 is a flowchart of an example of method 400 for providing user-customized keyboard input error correction based on contextual information. In various embodiments, method 400 may be performed by program instructions stored in system 300 and executed by hardware components 200 of IHS 100. Particularly, method 400 starts at block 401. At block 402, OS service 310 loads current system settings, some of which may be gathered, for example, via telemetry module 306. At block 403, OS service 310 identifies message queue 314 associated with application 315 with keyboard focus. Then, at block 404, OS service 310 receives keyboard raw input 313.

Block 405 loads ML policy 406 (e.g., configuration policy 308 in FIG. 3) and inference engine 312. For example, ML policy 406 may prescribe rule(s) and/or condition(s) that enable method 400 determine whether there an error in the keyboard input and/or how to correct the error in response to current contextual information (e.g., user identification, location, posture, time of day, and so on) matching such rule(s)/condition(s). Accordingly, at block 407, method 400 determines whether a rule or condition has been matched. If not, control returns to block 403. Otherwise, block 408 updates message queue 314 with corrected virtual keystrokes using keyboard filter driver 311 to apply the results of inference engine 312.

Corrections implemented by block 408 may take the form of transposing, adding, removing, or replacing a character from the keyboard input. For example, in a given user, hardware, and/or application context, the input "Matserston Station" may be corrected into "Masterson Station" by transposing the first character "t" with the first character "s," and by removing the second character "t."

In some cases, whether or not the error is recognized as such, and the type of correction applied, depends upon application of ML policy 406 to the current user, hardware, and/or application context. As an example, whether a zip code received as keyboard input is corrected and how may depend upon the current physical location of IHS 100. As another example, whether a proper name received as keyboard input is corrected and how may depend upon the particular application being used (e.g., a word processor or a messaging application).

Still referring to FIG. 4, at block 409, method 400 determines whether there is a new application or window open. If so, control returns to block 403. Otherwise, control passes to block 404.

FIGS. 5A-K illustrate examples of different IHS postures and/or other contextual information 500A-K that may be detected by operation of telemetry module 306 of FIG. 3 during execution of method 400 by IHS 100, and which may be used as rule(s)/condition(s) for determining whether to identify an input as an error and/or how to correct the error. In some implementations, different ranges of hinge angles may be mapped to different IHS postures as follows: closed posture (0 to 5 degrees), laptop or book posture (5 to 175 degrees), canvas posture (175 to 185 degrees), tent or stand posture (185 to 355 degrees), and/or tablet posture (355 to 360 degrees).

Figure 5A:
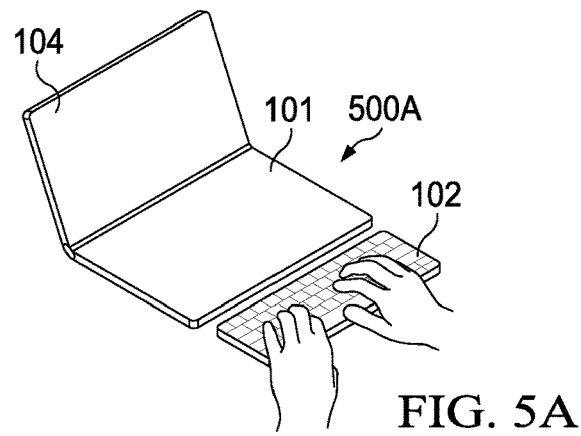
FIGS. 5A-K illustrate examples of different IHS postures and/or other contextual information, according to some embodiments.
Figure 5B:
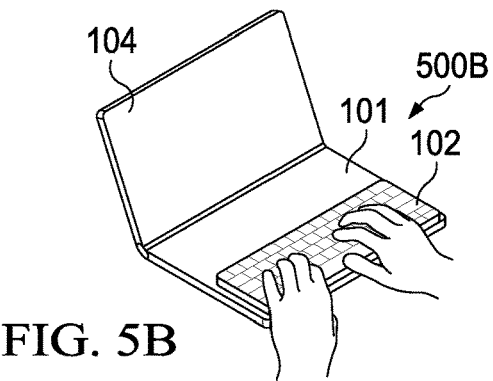

Particularly, FIGS. 5A and 5B show a laptop posture, where a first display surface of first display 104 is facing the user at an obtuse angle with respect to a second display surface of second display 101, and such that second display 101 is disposed in a horizontal position, with the second display surface facing up. In FIG. 5A, state 500A shows IHS 100 with keyboard 102 positioned off the bottom edge or long side of second display 101, and in FIG. 5B, state 500B shows the user operating keyboard 102 atop second display 101.

Figure 5C:
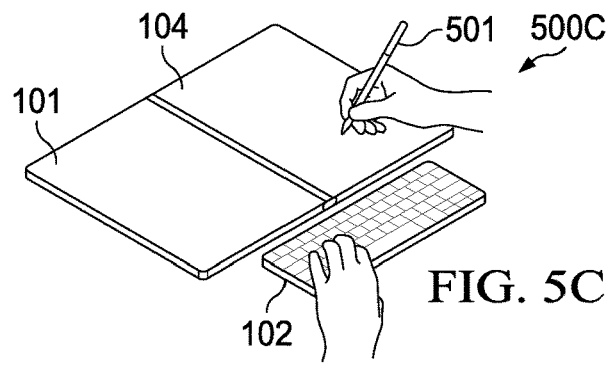

FIGS. 5C-H show a tablet posture, where first display 104 is at a straight angle with respect to second display 101, such that first and second displays 104 and 101 are disposed in a horizontal position, with the first and second display surfaces facing up. Specifically, FIG. 5C shows state 500C where IHS 100 is in a side-by-side, portrait orientation where keyboard 102 is being used off the bottom edges or short sides of display(s) 104/101, and where the user is operating styles 501, thus indicating one-handed operation of keyboard 102.

Figure 5D:
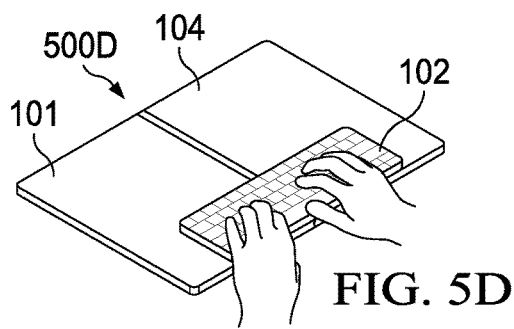
Figure 5E:
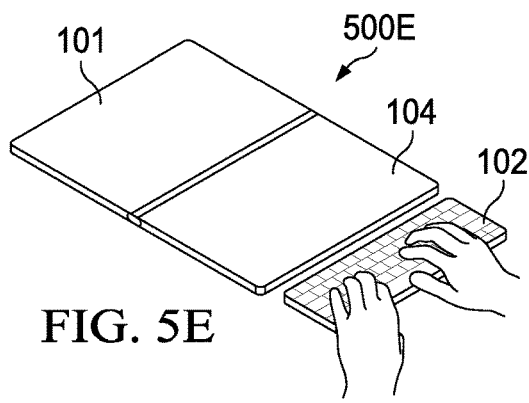
Figure 5F:
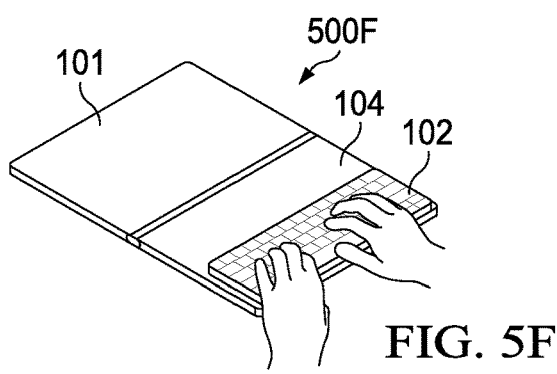

FIG. 5D shows state 500D where keyboard 102 is located over both displays 101 and 104. In FIG. 5E, state 500E shows IHS 100 in a side-by-side, landscape configuration with keyboard 102 being used off the bottom edge or long side of first display 104, and in FIG. 5F state 500F shows keyboard 102 on top of first display 104.

Figure 5H:
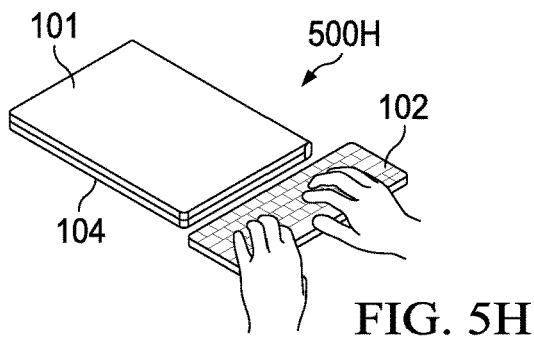
Figure 5G:
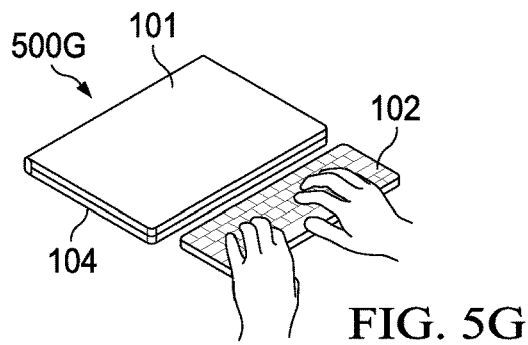

In FIG. 5G, state 500G shows second display 101 rotated around first display 104 via hinge 106 such that the display surface of first display 104 is horizontally facing down, and second display 102 rests back-to-back against second display 104, with keyboard 102 placed off the bottom or long edge of display 101. In FIG. 5H, state 500H shows the same configuration as state 500G, but in a portrait orientation.

Figure 5I:
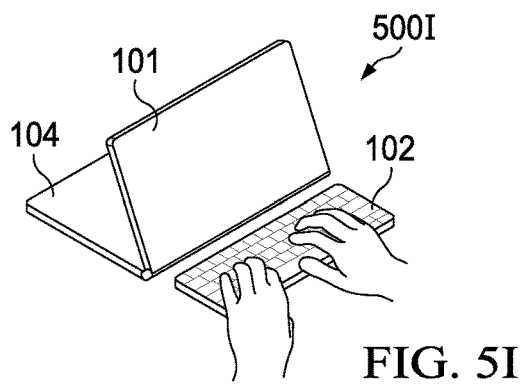
Figure 5J:
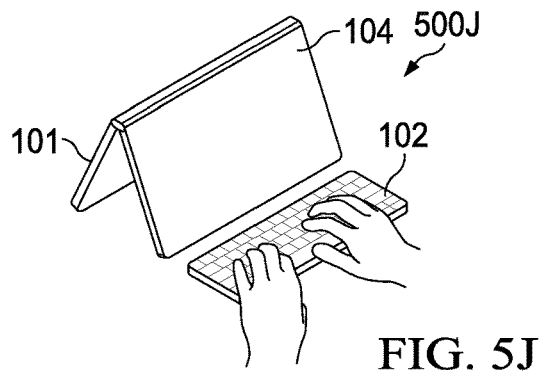
Figure 5K:
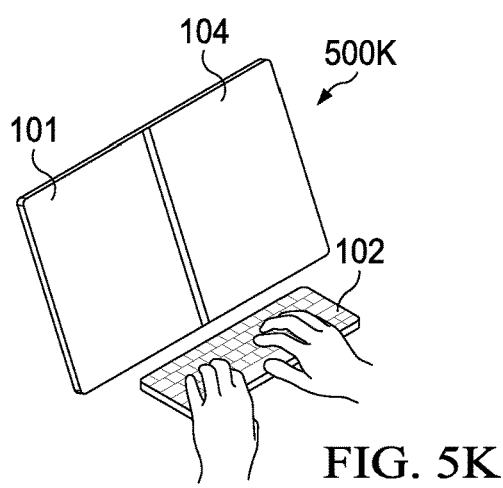

FIG. 5I shows display posture 500I, where first display 104 is at an acute angle with respect to second display 101, and such that second display 101 is facing the user and first display 104 is horizontally facing down in a stand configuration ("stand"). In FIG. 5J, state 500J shows a display posture where display 101 props up display 104 in a tent configuration ("tent"), and in FIG. 5K, state 500K shows both displays 101 and 104 resting vertically or at display angle with keyboard 102 used off the short sides of display 101/104.

Figure 6:
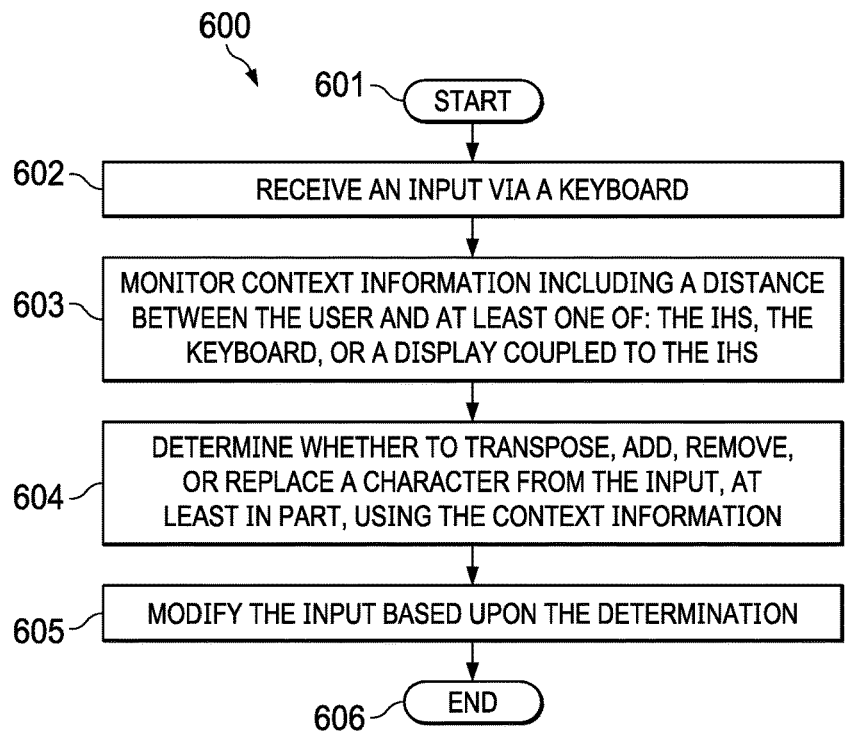
FIGS. 6 and 7 illustrate examples of methods according to some embodiments.

FIG. 6 illustrates an example of method 600 according to some embodiments. Particularly, method 600 starts at block 601. At block 602, method 600 receives an input via a keyboard. At block 603, method 600 monitors context information, where the context information comprises a distance between the user and at least one of: the IHS, the keyboard, or a display coupled to the IHS. At block 604, method 600 determines whether to transpose, add, remove, or replace a character from the input, at least in part, using the context information. At block 605, method 600 modifies the input based upon the determination. Method 600 ends at block 606.

Figure 7:
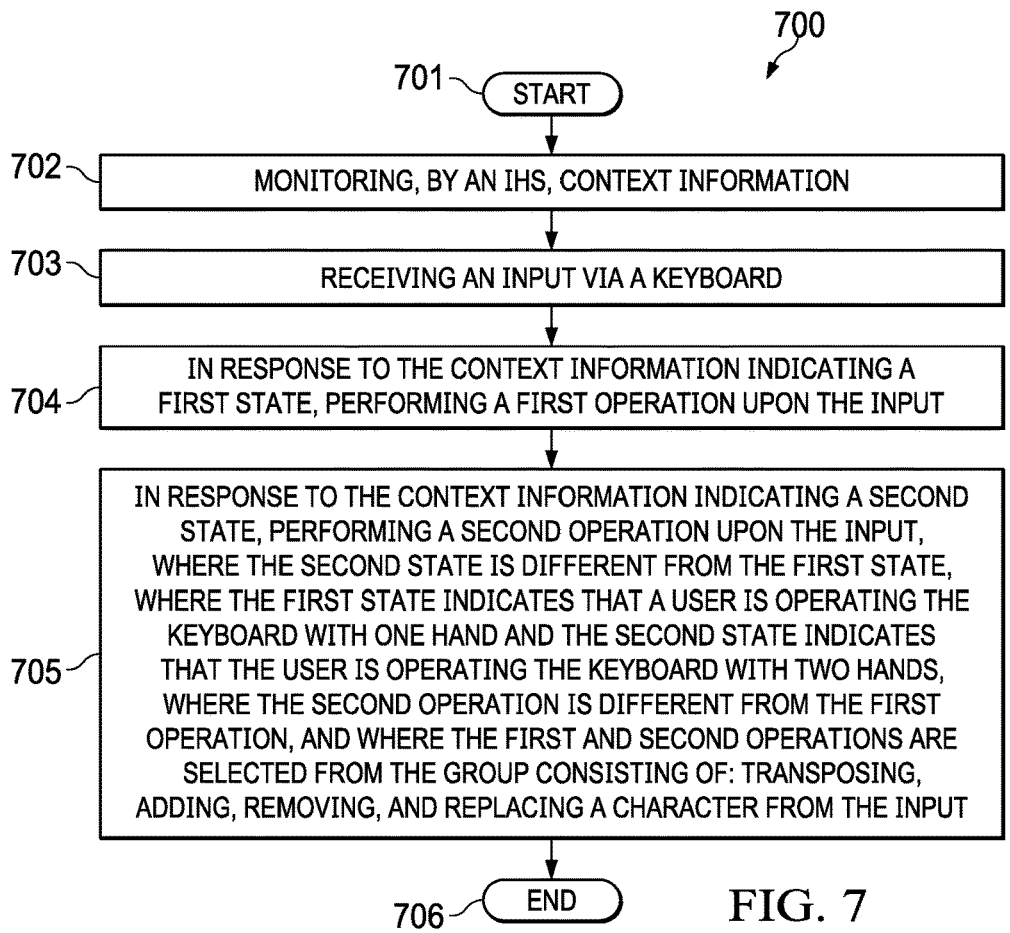

FIG. 7 illustrates an example of method 700 according to some embodiments. Particularly, method 700 starts at block 701. At block 702, method 700 monitors, by an IHS, context information. At block 703, method 700 receives an input via a keyboard. At block 704, in response to the context information indicating a first state, method 700 performs a first operation upon the input. At block 705, in response to the context information indicating a second state, method 700 performs a second operation upon the input, where the second state is different from the first state, where the first state indicates that a user is operating the keyboard with one hand and the second state indicates that the user is operating the keyboard with two hands, where the second operation is different from the first operation, and where the first and second operations are selected from the group consisting of: transposing, adding, removing, and replacing a character from the input. Method 700 ends at block 706.

It should be noted that the aforementioned postures, and their various respective keyboard states, are described for sake of illustration. In different embodiments, however, other postures and keyboard states may be used, for example, depending upon the type of hinge coupling the displays, the number of displays used, or other accessories. For instance, when IHS 100 is chargeable via a charging or docking station, the connector in the docking station may be configured to hold IHS 100 at angle selected to facilitate one of the foregoing postures.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS), comprising:
a processor; and
a memory coupled to the processor, the memory having program instructions stored thereon that, upon execution by the processor, cause the IHS to:
monitor context information, wherein the context information comprises a hinge angle;
receive an input via a keyboard; and
identify an error in the input, at least in part, based upon the context information.

2. The IHS of claim 1, wherein the context information comprises an IHS posture selected from the group consisting of: laptop, tablet, book, tent, and display.

3. The IHS of claim 1, wherein the context information indicates whether the IHS is coupled to a dock.

4. The IHS of claim 1, wherein the context information comprises a distance between the user and at least one of: the IHS, the keyboard, or a display coupled to the IHS.

5. The IHS of claim 1, wherein the context information comprises a type of keyboard, and wherein the type is selected from the group consisting of: a physical keyboard integrated into the IHS, a physical keyboard external to the IHS, and an on-screen keyboard.

6. The IHS of claim 1, wherein the context information comprises an identification of a user operating the keyboard.

7. The IHS of claim 1, wherein the context information comprises whether a user operating the keyboard is typing with one or two hands.

8. The IHS of claim 1, wherein the context information comprises an identification of a software application configured to receive the input.

9. The IHS of claim 1, wherein the context information comprises a time of day.

10. The IHS of claim 1, wherein the context information comprises a physical or geographic location of the IHS.

11. The IHS of claim 1, wherein the context information comprises a keystroke sequence preceding a backspace, deletion, insertion, or pause.

12. The IHS of claim 1, wherein the context information comprises a keystroke correction following a backspace, deletion, insertion, or pause.

13. The IHS of claim 1, wherein the context information comprises a keystroke speed.

14. The IHS of claim 1, wherein the context information comprises a keystroke acceleration or deceleration.

15. The IHS of claim 1, wherein the program instructions, upon execution, further cause the IHS to correct the error, at least in part, based upon the context information.

16. The IHS of claim 15, wherein to correct the error, the program instructions, upon execution, further cause the IHS to:
in response to the context information indicating a first state, perform a first operation upon the input; and
in response to the context information indicating a second state, perform a second operation upon the input, wherein the second state is different from the first state and wherein the second operation is different from the first operation.

17. The IHS of claim 16, wherein the first and second operations are selected from the group consisting of: transposing, adding, removing, and replacing a character from the input.

18. A memory device having program instructions stored thereon that, upon execution by a processor of an Information Handling System (IHS), cause the IHS to:
receive an input via a keyboard;
monitor context information, wherein the context information comprises a distance between the user and at least one of: the IHS, the keyboard, or a display coupled to the IHS;
determine whether to transpose, add, remove, or replace a character from the input, at least in part, using the context information; and
modify the input based upon the determination.

19. A method, comprising:
monitoring, by an Information Handling System (IHS), context information;
receiving an input via a keyboard;
in response to the context information indicating a first state, performing a first operation upon the input; and
in response to the context information indicating a second state, performing a second operation upon the input, wherein the second state is different from the first state, wherein the first state indicates that a user is operating the keyboard with one hand and the second state indicates that the user is operating the keyboard with two hands, wherein the second operation is different from the first operation, and wherein the first and second operations are selected from the group consisting of:
transposing, adding, removing, and replacing a character from the input.

* * * * *